United States Patent [19]
Taylor et al.

[11] Patent Number: 5,912,961
[45] Date of Patent: *Jun. 15, 1999

[54] INTELLIGENT COMMUNICATIONS NETWORKS

[75] Inventors: Andrew Paxton Taylor, Ipswich, United Kingdom; Steven Hollywood, Wellington, New Zealand

[73] Assignee: British Telecommunications public limited company, London, United Kingdom

[ * ] Notice: This patent is subject to a terminal disclaimer.

[21] Appl. No.: 08/776,529

[22] PCT Filed: Aug. 4, 1995

[86] PCT No.: PCT/GB95/01850

§ 371 Date: Jun. 18, 1997

§ 102(e) Date: Jun. 18, 1997

[87] PCT Pub. No.: WO96/04742

PCT Pub. Date: Feb. 15, 1996

[30] Foreign Application Priority Data

Aug. 4, 1994 [EP] European Pat. Off. .............. 94305854

[51] Int. Cl.$^6$ ............................. H04M 3/42; H04M 1/64
[52] U.S. Cl. ......................... 379/201; 379/207; 379/266; 379/88.25
[58] Field of Search ................................. 379/201, 88.01, 379/88.2, 88.21, 88.25, 88.04, 207, 219, 265, 266, 210, 211, 212, 221

[56] References Cited

U.S. PATENT DOCUMENTS 5,243,643  9/1993  Sattar et al. ............................. 379/88
5,537,466  7/1996  Taylor et al. ......................... 379/88.21

FOREIGN PATENT DOCUMENTS 0378694    7/1990   European Pat. Off. .
1581477   12/1980   United Kingdom .
WO 91/17616 11/1991  WIPO .

OTHER PUBLICATIONS

O'Reilly et al, "Experiences in Prototyping the Intelligent Network", IEEE Global Communications Conference, Nov. 29–Dec. 2, 1997, vol. 3/4, Houston, US, pp. 1923–1930.

Hollywood, "SCP Development in a Multi–Processor Unix Environment", Proc. Int. Council for Computer Communications, May 4–6 1992, Tampa, pp. 278–287.

Van Hal et al, "Service Script Interpreter, An Advanced Intelligent Network Platform", Ericsson Review, vol. 67, No. 1, 1990, Stockholm, SE, pp. 12–22.

Bright et al, "Service Creation in an Intelligent Network", IEEE Global Telecommunications Conference & Exhibition, Nov. 27–30, 1989, vol. 1/3, Dallas (US), pp. 137–140.

*Primary Examiner*—Harry S. Hong
*Assistant Examiner*—Benny Q. Tieu
*Attorney, Agent, or Firm*—Nixon & Vanderhye P.C.

[57] ABSTRACT

A service node is used in an intelligent communications network for providing services for customers. The node defines a plurality of services; a first resource including a speech segment store containing, in use, speech segments, each segment having a corresponding identity, and a resource controller arranged to convert a received command signal to a corresponding succession of speech segment identities for a speech announcement corresponding to the command signal, to access the speech segment store in accordance with speech segment identities, to generate corresponding speech segments for the speech announcement and to provide an announcement finished signal when a last speech segment of the announcement has been generated; a switch arranged to connect the first resource to an incoming call routed by the network to the service node; and a node controller arranged to respond to such an incoming call to pass details of the call to the service apparatus for processing, queuing the call as necessary, to pass signals from the service apparatus to the first resource and to the switch, and to pass announcement finished signals from the first resource to the service apparatus.

12 Claims, 10 Drawing Sheets

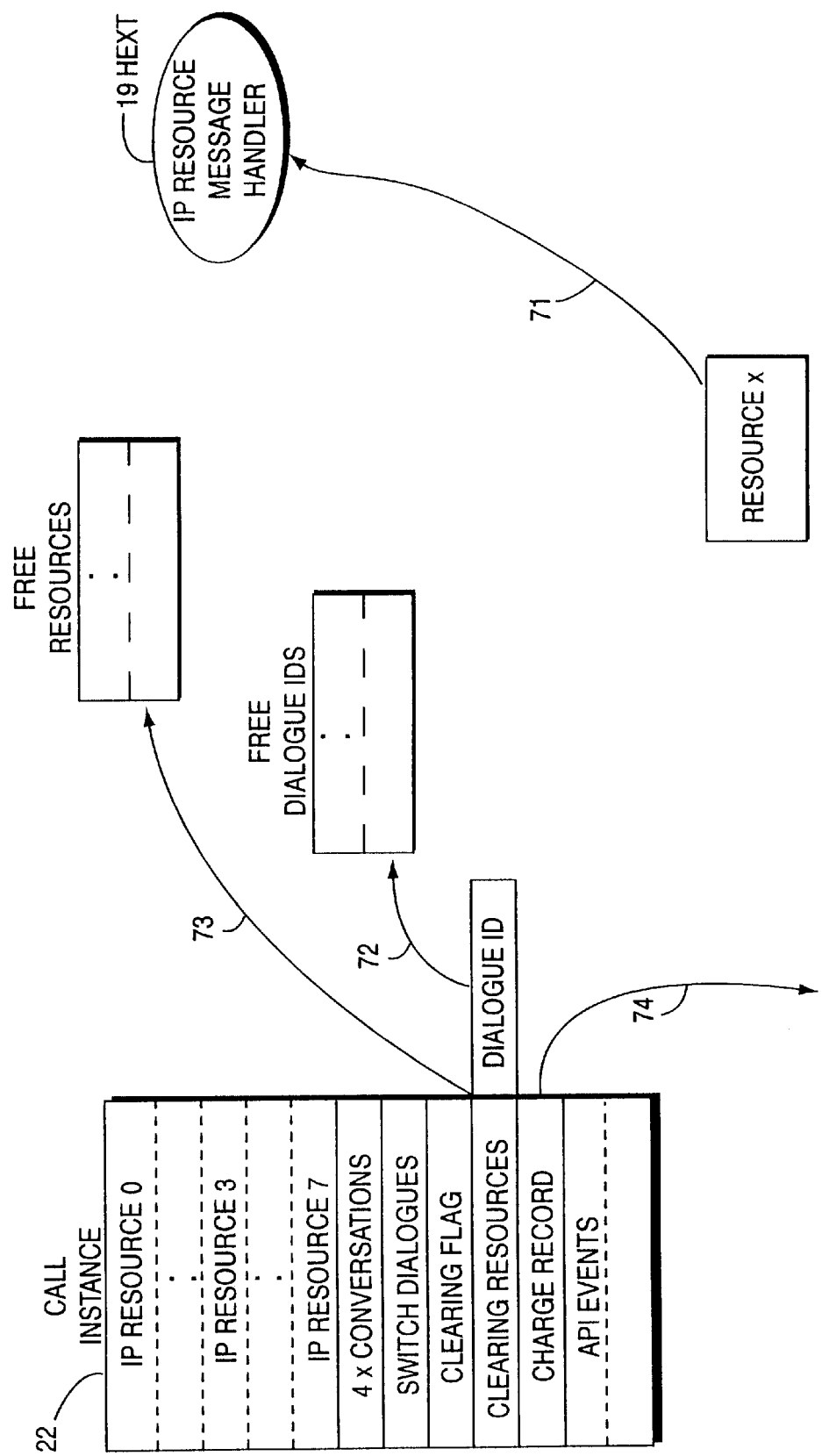

INTELLIGENT COMMUNICATIONS NETWORKS

RELATED APPLICATIONS

This application is related to PCT application PCT/GB95/01850 filed Aug. 4, 1995 and to commonly assigned U.S. application Ser. No. 311,751 filed Sep. 23, 1994 (now issued as U.S. Pat. No. 5,537,466), both of which applications claim priority rights based on European application 94/305854 filed Aug. 4, 1994.

1. Field of the Invention

This invention relates to a method of and a service node for providing services in an intelligent communications network.

2. Related Art

Before the advent of the stored program controlled (SPC) exchange, the Public Switched Telephone Network (PSTN) comprised electromechanical exchanges, such as Strowger and Crossbar exchanges, and electronic exchanges, such as TXE2 and TXE4 exchanges. However, even the most advanced of these types was only capable of performing a limited number of functions over and above merely switching a call, i.e. making a connection between an incoming channel or line and an outgoing channel. Furthermore, such additional functions were limited to operations for improving the performance of the network, for example, repeat attempt at reaching a destination number via an alternative outgoing route in the event that the first-choice route is busy.

SPC exchanges enabled customers to control various supplementary services via signals entered on their telephone keypad using the * and # buttons. However, the introduction of a new service, or the modification of an existing service, meant that the control program had to be updated in each of the SPC exchanges.

The current concept of an intelligent communications network is based on a core of interconnected Digital Main Switching Units (DMSU's), with local exchanges connected to the DMSU's (usually with each local exchange connected to two DMSU's for network resilience in the event of an DMSU failure), and with services being provided and controlled by discrete service nodes at various positions in the network.

Each service node is connected to an DMSU of the network, which recognises service access digits dialled by a customer and routes the call to the service node for the provision of the requested service for the customer.

As an example of the abovementioned concept, an Intelligent Network testbed architecture is disclosed in the article "Experiences in Prototyping the Intelligent Network", by Peter O'Reilly, Hing Fai (Louis) Chong, Russell Sivey and Lawrence Lattanzi; IEEE Global Telecommunications Conference, Nov. 29 to Dec. 2, 1993; Volume 1 of 4, pages 1923 to 1930. In this architecture, a Service Control Point (SCP) is connected by a signalling link, known to telecommunications engineers as a C7 or SS7 link, to a switch. The SCP is also connected by a data link for call control commands and messages to an intelligent peripheral (IP) containing resources such as announcements and digit collection. The IP is connected to the switch by a communications link providing a voice path.

The article "Service Script Interpreter, An Advanced Intelligent Network Platform" by Paul van Hal, Jan van der Meer and Nael Salah, published in Ericsson Review No. 1, 1990, pages 12 to 22, describes various network elements of Ericsson's Intelligent Network Architecture. One of these elements is an Intelligent Peripheral (IP) which is a collection of versatile and cost-effective equipment allowing communications between the Intelligent Network and its subscribers. The IP can send a number of different announcements to subscribers and receive digits from dual tone multi-frequency (DTMF) telephones, the announcements being either of a fixed format or having a variable part. The IP can be provided as a separate node accessible by several Service Switching Points (SSPs) through which it is controlled by commands from respective Service Control Points. Digits received by the IP are sent to the controlling SCP, through the associated SSP, for analysis.

In known Intelligent Network architectures, such as disclosed in these two prior published articles, control of the various parts of services is concentrated in the Service Logic Programs. This may be seen more clearly in the Ericsson article wherein announcement equipment is commanded to play a selected announcement by a message, referred to as Query or Prompt, sent from the service logic in the SCP, and digit collection equipment is commanded to collect digits by a Collect digits message sent from the SCP. The digit collection equipment receives digits dialled by a subscriber (customer) and sends them in a User digits message to the SCP for analysis. If the outcome of the analysis is, for example, that the digits do not form a recognisable number (this may be too few digits received in the timeout, or a mismatch with stored account data), then the SCP generates a suitable command and sends it to the announcement equipment in order to prompt the customer to re-dial the digits. At the same time, the SCP will have to send another Collect digits message, since the digit collection equipment will have completed its operation in response to the original Collect digits message by collecting digits and sending a response message (i.e. the User digits message).

In International Application Number PCT/US91/03086 (Publication Number WO 91/17616) a disk system stores voice message segments (VMS), each VMS having an identifying address number. When it is desired to play a voice message to a subscriber, a Send Message command is sent to an input/output controller for the disk system, including fields designating the Channel Number, Call ID and Message Number of the message to be sent. The controller refers to a look-up table, by which it converts the Message Number to a respective sequence of VMSs, retrieves the sequence of VMSs and sends the VMSs contiguously to the subscriber.

SUMMARY OF THE INVENTION

According to a first aspect of the present invention there is provided a service node for use in an intelligent communications network for providing services for customers, comprising:

service defining means arranged to define a plurality of services;

a resource means comprising a plurality of speech applications platforms (SAPs) and a plurality of digit collecting means;

a switch connected by a speech path means to said resource means; and node controlling means connected to the switch by a signalling link and arranged to respond to an incoming call from a customer routed by the network to the service node by passing details of the call to the service defining means for processing, queuing the call if required due to already ongoing call processing, logically connecting the service defining means to the resource means and to the switch for the passage of command signals and response signals, and commanding the switch to connect the resource means to the incoming call:

the node being characterised in that:

each SAP comprises a store for storing speech segments, each segment having a corresponding identity, and a controlling means arranged to respond to receipt of a predetermined command signal containing the identity of a predetermined speech announcement by converting the identity of the predetermined speech announcement to a corresponding succession of speech segment identities, accessing its speech segment store in accordance with the speech segment identities, controlling the SAP to generate the corresponding speech segments for the speech announcement, commanding the connection of a digit collecting means to the incoming call and activating it to collect from the customer a predetermined number of digits, and commanding a corresponding response signal, including the predetermined number of collected digits, to be sent to the node controlling means.

An advantage to the present invention is that the service defining means does not have to be concerned with controlling the separate functions of the resource but merely issues a command to the resource to play an announcement and return the digits provided by the customer. By placing control of the digit collecting means in the resource, i.e. the generation of the activation command, this reduces the amount of processing that the service defining means has to do in providing a service to a customer, and enables faster service operation and simpler software code than in known Intelligent Networks.

Preferably, the plurality of digit collecting means is separate from the plurality of SAPs, the speech path means comprises respective first speech paths from the switch to the SAPs and respective second speech paths from the switch to the plurality of digit collecting means, and each SAP controlling means is arranged to respond further to receipt of the predetermined command signal by reserving one of said plurality of digit collecting means and commanding the switch to connect the respective second speech path of the reserved digit collecting means to the incoming call.

Alternatively, each SAP is associated with a respective one of said digit collecting means, the speech path means comprises respective first speech paths from the switch to the SAPs and a respective second speech path from each SAP to its associated digit collecting means, and each SAP controlling means is arranged to respond further to receipt of the predetermined command signal by controlling its SAP to connect its respective first speech path to its respective second speech path.

Preferably, each SAP controlling means is arranged to command the activated digit collecting means connected to the incoming call to send the response signal to the node controlling means.

Alternatively, each SAP controlling means is arranged to command the activated digit collecting means connected to the incoming call to provide the collected digits for inclusion in the response signal.

Preferably, the resource means further comprises a database of customer-related digits, and means for validating the predetermined number of collected digits by comparison with corresponding digits stored in the database for the customer, and each SAP controlling means is arranged to respond further to receipt of the predetermined command signal by providing the collected digits to the validating means and commanding the validating means to validate the collected digits and return a signal indicative of the result of the validation.

Preferably, each SAP controlling means is arranged to respond to receipt of a further command signal containing the identity of a further speech announcement offering the customer a plurality of numbered service-related options, by:

converting the identity of the further speech announcement to a corresponding succession of speech segment identities;

accessing its speech segment store in accordance with the speech segment identities;

controlling its SAP to generate the corresponding speech segments for the further speech announcement;

activating a digit collecting means connected to the incoming call to collect a digit representing the customer's selection from the numbered service-related options;

and, in response to collection of said digit, generating a still further speech announcement corresponding to the collected digit and offering a different plurality of numbered service-related options.

The resource means will have sufficient intelligence to perform a significant proportion of the service and gain the advantage of reduced communication with the service defining means and yet not be so intelligent that the resources become an unduly high proportion of the cost of the service node.

In accordance with a second aspect of the present invention there is provided a method of operating a service node in an intelligent communications network for providing services for customers, comprising the steps of: receiving from a customer an incoming call routed by the network to the service node and passing details of the incoming call to a service defining means for processing, queuing the call if required due to already ongoing call processing; connecting a digit collecting means, and a speech applications platform (SAP), to the incoming call in response to a request from the service defining means; sending a command signal containing the identity of a predetermined speech announcement from the service defining means to the SAP; the method being characterised by the steps of responding to receipt of the command signal by the SAP, by:

converting the identity of the predetermined speech announcement to a corresponding succession of speech segment identities;

accessing, in accordance with said speech segment identities, a speech segment store and retrieving speech segments corresponding to the speech segment identities;

generating the retrieved speech segments;

collecting with the digit collecting means a predetermined number of digits dialled by the customer; and sending to the service defining means a response signal including the predetermined number of digits.

Preferably, the connecting step comprises controlling a switch, at which the incoming call is received, to connect the incoming call to first and second speech paths coupling the switch to the SAP and the digit collecting means, respectively.

Alternatively, the connecting step comprises controlling the SAP to connect a first speech path, which extends from the SAP to a switch, at which the incoming call is received, to a second speech path, which extends from the SAP to the digit collecting means.

More preferably, the SAP further responds to receipt of the command signal by providing the collected digits to a validating means and commanding the validating means to validate the collected digits and return a signal indicative of the result of the validation.

Preferably, there are included the further steps of sending to the SAP a further command signal containing the identity of a further speech announcement offering the customer a plurality of numbered service-related options, and, on receipt of said further command signal at the SAP, generating the further speech announcement, collecting a digit representing the customer's selection from the numbered service-related options and, in response to collection of said digit, generating a still further speech announcement corresponding to the collected digit and offering a different plurality of numbered service-related options.

BRIEF DESCRIPTION OF THE DRAWINGS

A specific embodiment of a service node in accordance with the present invention will now be described by way of example with reference to the drawings in which:

FIG. 11 is a diagram showing the procedure when the resource clears down.

DETAILED DESCRIPTION OF EXEMPLARY EMBODIMENTS

Figure 1:
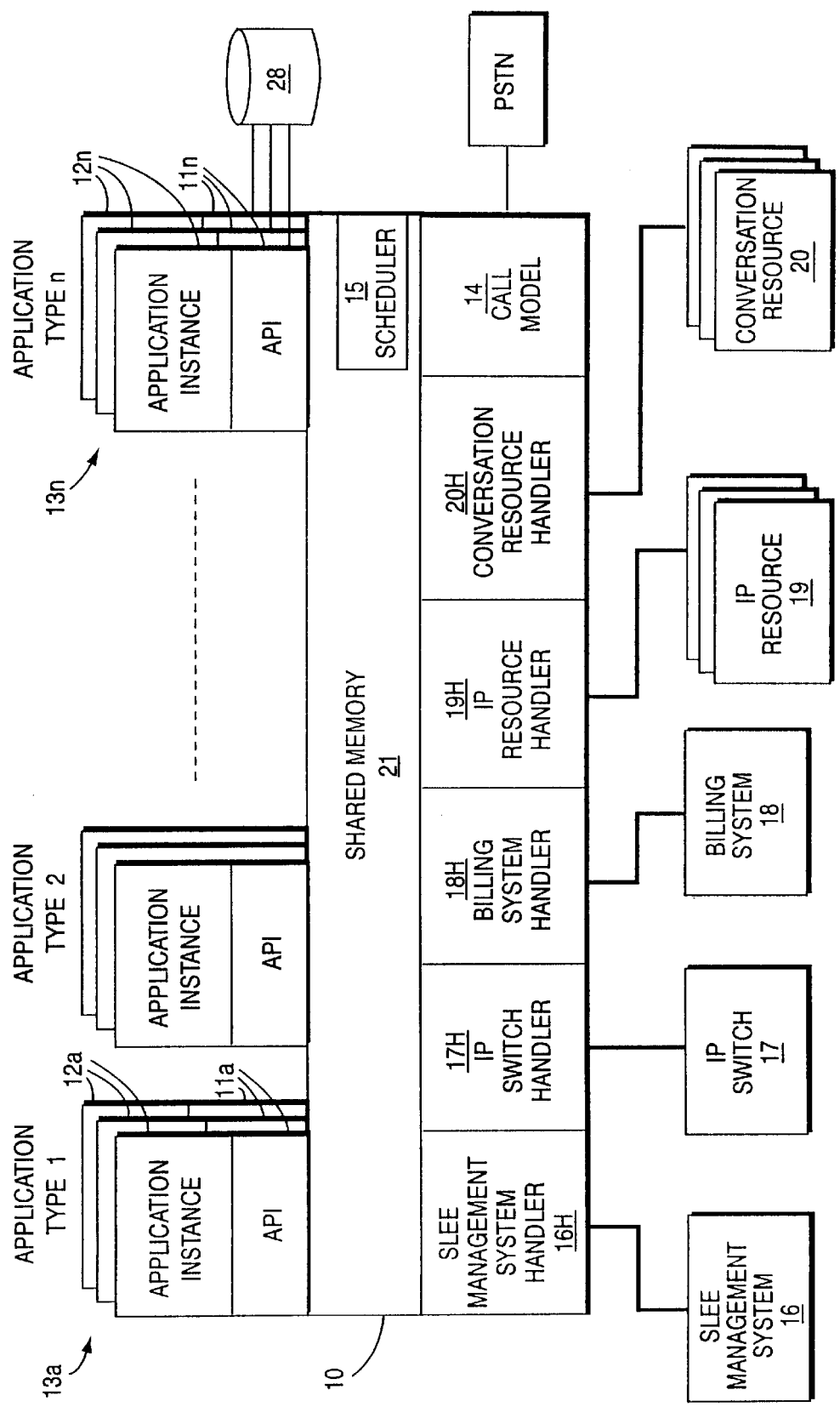
FIG. 1 is a schematic diagram of a Service Logic Execution Environment of the service node.

As can be seen in FIG. 1, the major part of the service node of the present invention is the central control function which is designated the Service Logic Execution Environment (SLEE) 10 and which constitutes a controlling means of the present invention.

The SLEE 10 comprises a respective Application Programming Interface (API) process, 11a to 11n, for each of a plurality of Application Instances (constituting service defining means of the present invention), 12a to 12n, in each of a plurality of Application Types, 13a to 13n, a Call Model process 14, a Scheduler process 15, and a handler process for each of a plurality of subsystems of the service node, namely SLEE Management System 16, Switch 17, Billing System 18, a plurality of Intelligent Peripheral (IP) Resources 19 having a common handler 19H, and a plurality of Conversion Resources 20 having a common handler 20H. The Resources 19 and 20 together constitute a resource means of the present invention.

In this specification the terms Intelligent Peripheral and Service Node are to be taken as having the same effective meaning, although, in practice, a Service Node is constituted by an Intelligent Peripheral together with a switch 17.

In this embodiment, each of the IP Resources 19 is a speech applications platform (SAP) containing its own digit collection means. In alternative embodiments, there is a plurality of digit collection means which can be reserved and associated with a SAP as and when needed for services involving digit collection.

Each of the Conversation Resources 20 is a non-speech resource, i.e. a resource which is not connected to a port of the switch 17 and which is not arranged to send or receive signals from the customer (MF signals or speech). Examples of types of Conversation Resources 20 are personal identification number (PIN) validation, protocol conversion for when the service node needs to communicate with a remote resource or system, and management logic for managing entries in database 28.

For convenience, the above processes will generally be referred to by the process name, and each handler will be identified as 16H, 17H, etc. Handler 19H has an internal part 19Hint which interfaces signals between applications and a Shared Memory 21 of the SLEE, and an external part 19Hext which interfaces signals to and from the IP Resources 19.

Each of the component parts of the SLEE 10 is implemented as a UNIX (a trade mark of AT & T) process on a platform which need not be described in detail but which is in the form of a multi-processor, multi-tasking, fault tolerant UNIX environment. Where appropriate, these processes comprise sub-processes for both-way communication of messages. Such sub-processes are well known to the skilled person in the art and will not be mentioned specifically, apart from Switch Message Handler 26, which constitutes a message receiving sub-process of the Switch Handler 17H.

The component processes of the SLEE 10 communicate with each other through a block of the Shared Memory 21 which they can all access. This arrangement of separate processes working in parallel greatly reduces the likelihood of serious bottlenecks.

Application Instances are started up by the SLEE Management System 16 at the initialisation of the SLEE 10 and each new call entering the platform creates a new Call Instance 22 (FIG. 2) in the Shared Memory 21.

Figure 2:
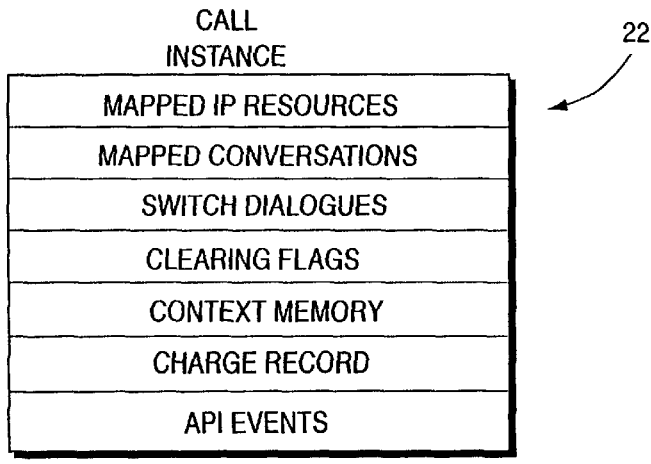
FIG. 2 is a diagram showing the storage locations of a Call Instance used in services provided by the service node.

Each Call Instance 22 holds data specific to a respective call, and the various categories of data shown in FIG. 2 are Mapped IP Resources, Mapped Conversations, Switch Dialogues, Clearing Flags, Context Memory, Charge Record, and API Events. Some of these categories have more than one storage location in the Call Instance, e.g. IP Resource and API Events.

Each Application Type 13 can provide one or more defined services, and different calls (possibly using different services) can all share any one Application Instance 13 by being cut in and out as the application requires. The Context Memory of a Call Instance 22 is used by an application to keep track of the state that a call is in.

Multiple Application Instances 12 of the same Application Type 13 are provided in order that a number of calls using the same service can run in parallel. The Scheduler 15 of the SLEE 10 manages the allocation of calls to the Application Instances 12 so that call events can be processed.

Figure 3:
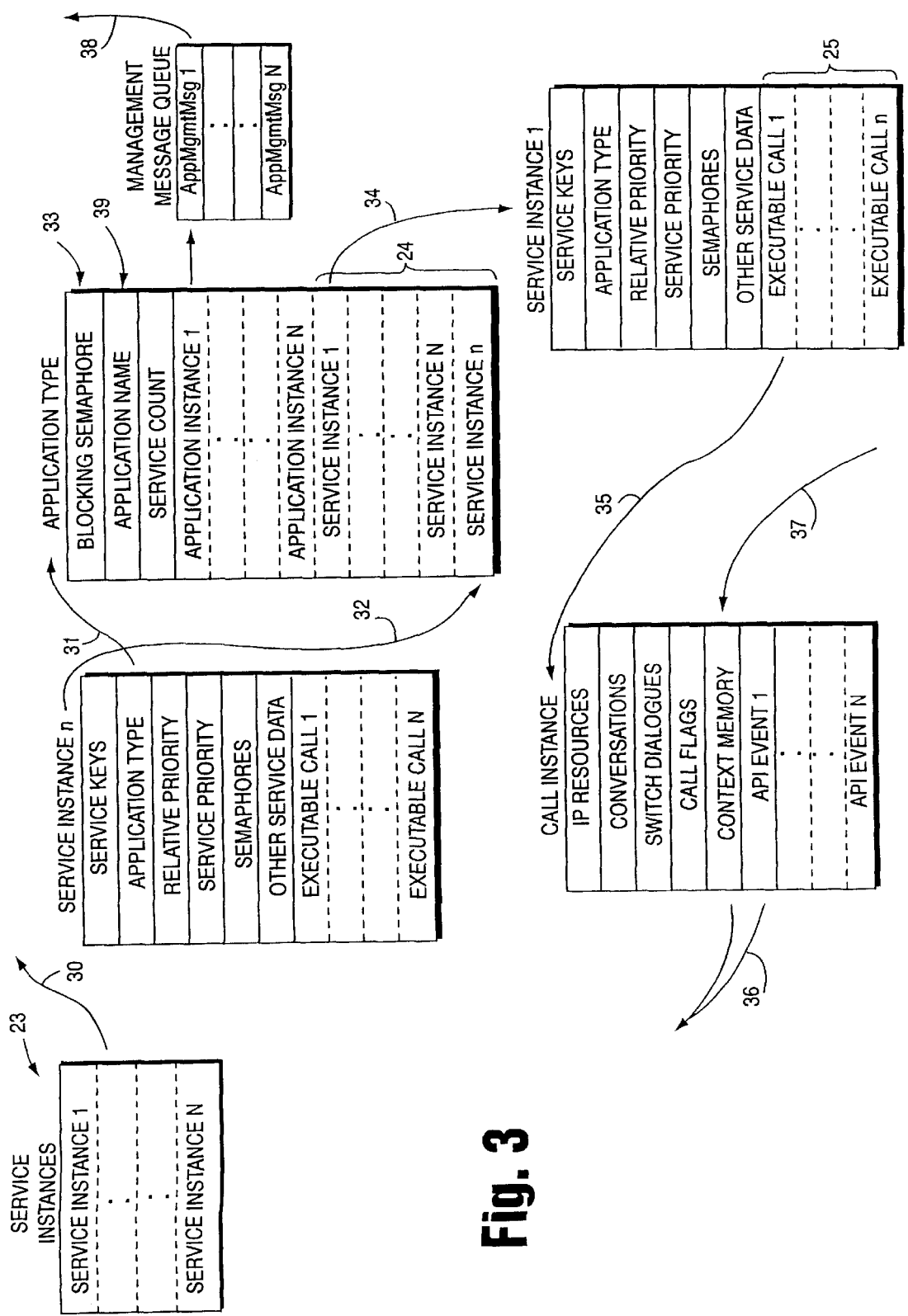
FIG. 3 is a diagram showing the processing of a Call Event.

As external events occur, the handlers queue them on their respective Call Instances 22. FIG. 3 shows the various steps by which these call events are retrieved and sent to an application for processing.

The Scheduler 15 decides which service will be the next to run on the basis of the relative priorities of each Service Instance 23. These priorities are recalculated each time that the Scheduler 15 is activated such as to ensure that whilst all services will run at some time, those with higher service priorities (which are set by the SLEE Management System 16) will run more often. The Service Instance with the highest relative priority and with Executable Calls queued on it is chosen to be run (this first step is referenced 30 to avoid overlap with other reference numerals). The Scheduler 15 retrieves the service's owning Application Type (step 31) and adds the Service Instance 23 to the bottom of the Service Queue 24 (step 32). A Blocking Semaphore in the Application Type 13 is increased by the Scheduler 15 (step 33), signalling that another call is ready to be processed by one of the Application Instances 12 belonging to this Application Type 13. When this happens, the next Service Instance 23 is moved off the queue 24 (step 34) and the next Call Instance 22 is removed from its Executable Call Queue 25 (step 35). The first API Event belonging to this Call Instance 22 is sent together with the call's Context Memory to the application to be processed (step 36).

The application performs the tasks necessary to act upon this event, and upon completion of those application tasks it issues an API Suspend command and then an API Provide Instruction command, and modifies the Context Memory (step 37) to reflect the change of state of the call. Any Management Events queued for the application are issued to it (step 38) before the process blocks on its semaphore (step 39) ready for the next call event.

The application sends the API Suspend command to the SLEE 10 to release (dissociate) the Call Instance 22 from the application, and sends the API Provide Instruction command to cause the application to become blocked ready for the next call.

There now follows a description of the processes which occur for a typical call scenario for a message recording service provided by the service node. Whilst there are many difference tasks that can occur, every call using the platform proceeds in a similar way to the following description.

Assume that a customer has subscribed to a network-based message recording service (hereinafter referred to as "voicemail service"), the platform (not shown) for which includes a database for storing deposited spoken messages and is associated with an DMSU of the PSTN. When the customer has activated the voicemail service, calls to the customer are automatically connected by the network to the platform and any desired spoken messages (hereinafter referred to as "voicemail messages") are recorded for later retrieval by the customer, and the voicemail platform will send information about the voicemail messages (customer account number, caller's name) to the application in the service node for storage in the database 28, which increments the stored calls register associated with that account number and stores the name in association with an index representing the current position of that voicemail message in the voicemail platform database.

When the customer wishes to find out if he has any voicemail messages waiting for him, he dials the service access digits for gaining access to the voicemail service and the PSTN routes the call (regardless of where it has originated on the network) to the service node.

Figure 4:
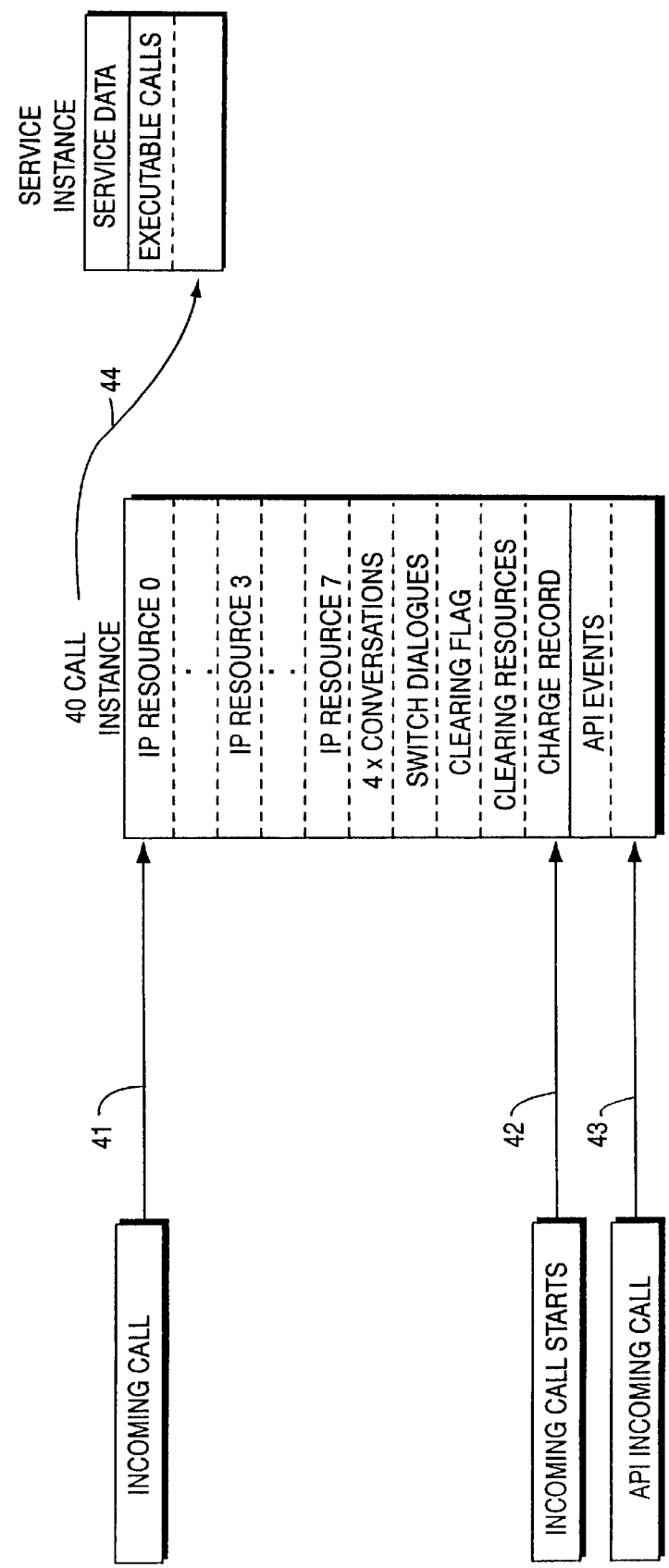
FIG. 4 is a diagram showing initialisation of the Call Instance.

Referring to FIG. 4, when this call arrives at the service node the digits are passed via a signalling link from the switch 17 to the Call Model 14 which recognises the dialled service access digits for the voicemail service and, in response, creates and initialises a new Call Instance 22 (step 40) within the SLEE's Shared Memory 21 and maps the incoming call to its first IP Resource, namely IP Resource 0 (step 41). The actual IP resource will be the incoming channel on which the incoming call appears and it will be the identity of this channel that will be mapped to the IP Resource 0 location of the Call Instance 22. The Call Model 14 initialises the call's Charge Record by recording the incoming call or event with a time stamp (step 42) in the Charge Record location of the Call Instance 22. The SLEE 10 then puts an API Incoming Call event on the call's API Events queue (step 43) and queues the Call Instance 22 as an Executable Call on the appropriate Service Instance 23 (step 44).

The Scheduler 15 is triggered and the call event processing phase is entered, as described with reference to FIG. 5.

Figure 5:
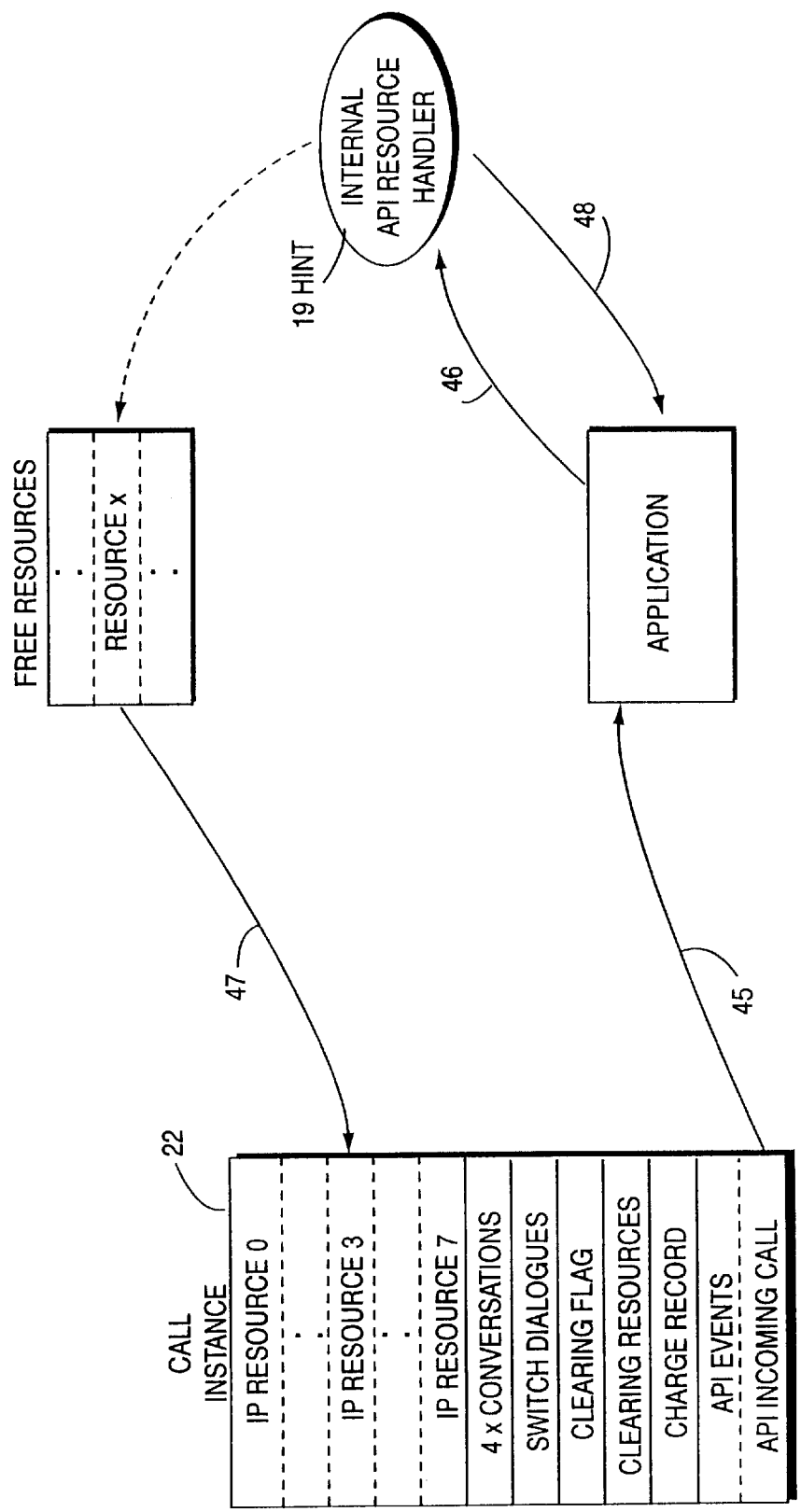
FIG. 5 is a diagram showing the allocation of a resource to the Call Instance.

Referring to FIG. 5, when the Scheduler 15 decides that it is time for a call to execute, the SLEE 10 sends to the Application 13 the API Incoming Call Event from the Call Instance's API Events queue (step 45). The application receives this event, refers to a state table of events (not shown) and runs from the next following position, which in this case of a new call is from the beginning of the service.

The application will require the use of at least one IP Resource other than IP Resource 0. First, it must reserve a resource on a free one of the call's application-mapped IP Resources (e.g. Resource 3) by sending an API Reserve Resource message to the SLEE 10 (step 46). The application will itself select the free IP Resource in the Call Instance 22 and ask the SLEE 10 to reserve a free resource and map its identity to the selected IP Resource. The SLEE's Internal API Resource Handler 19Hint receives the message, finds a free (unused) resource of the correct type in the Free Resources store (Resource X) and maps it to the call by moving the resource identity from Free Resources to the Call Instance's IP Resource 3 (step 47). In this step, the resource may be actually removed from Free Resources, or it may be effectively removed by setting a flag to mark that resource as in use and not free. A success message is returned to the application as a return code (step 48).

Figure 6:
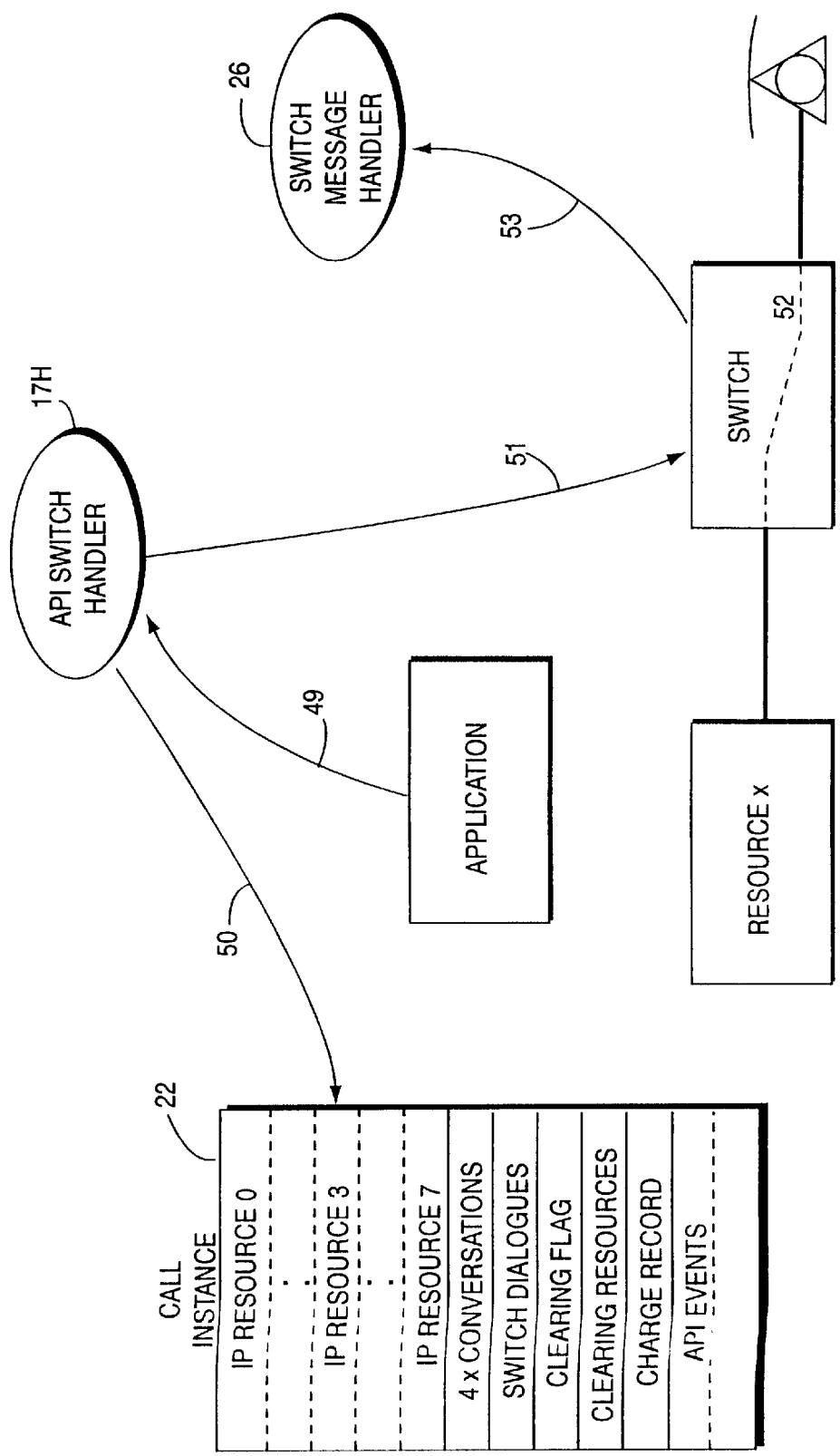
FIG. 6 is a diagram showing the connection of a speech path between the resource and a caller.

To make use of the resource the application must connect its speech channel to that of the call as shown in FIG. 6. It does this by sending an API Connect message (step 49) with reference to the two resources it wants to connect (i.e. IP Resource 0, the incoming call, and IP Resource 3, the required resource).

The SLEE's API Switch Handler 17H receives the message, allocates (reserves) a free Switch Dialogue Id to the Call Instance 22 (step 50) and uses it to send a request for connection to the switch 17 (step 51). The switch 17 receives the request and connects the call to Resource X (step 52). It signals success back to a Switch Message Handler 26 of the SLEE 10 (step 53).

Figure 7:
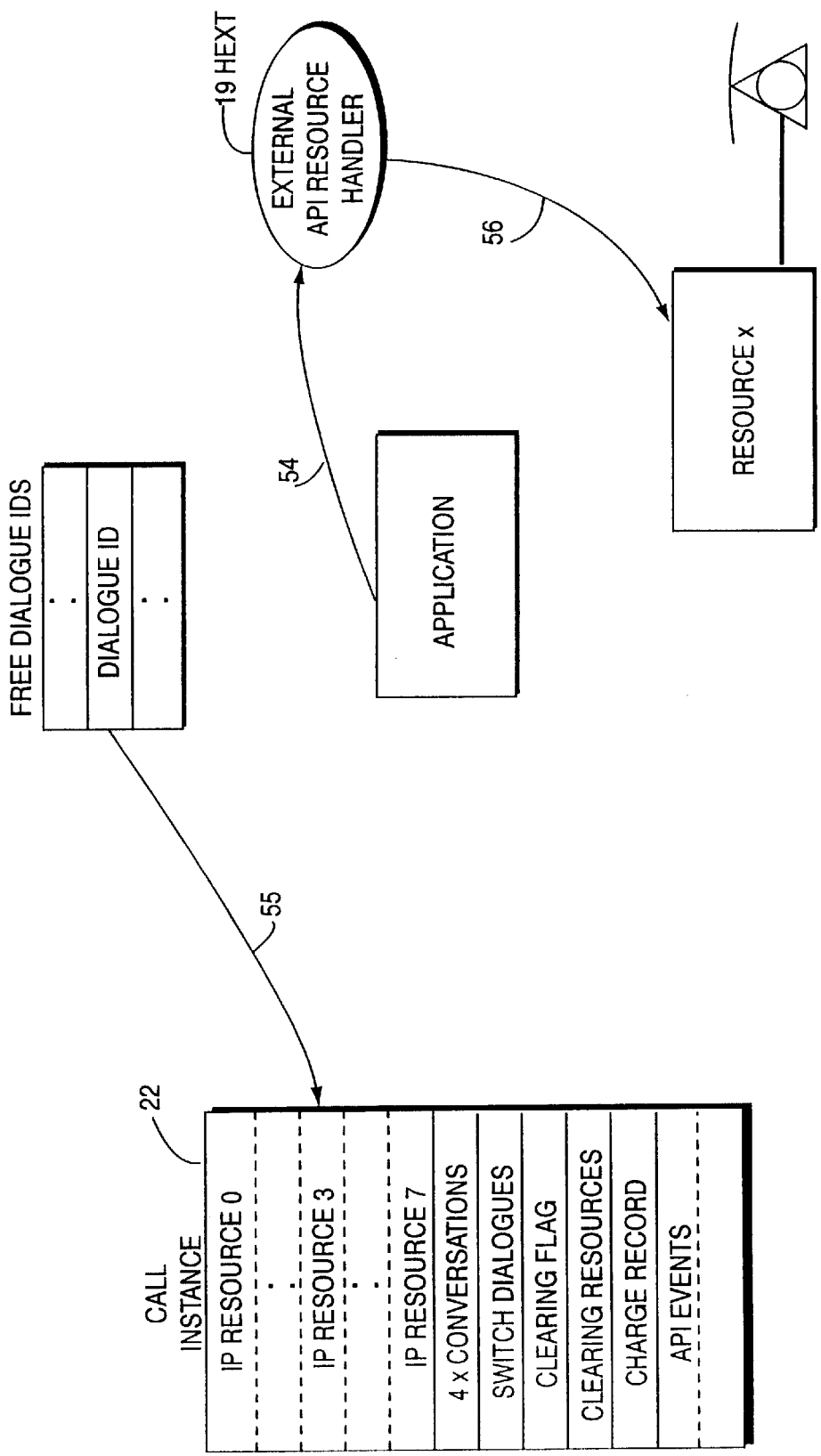
FIG. 7 is a diagram showing the command of the resource by an application.

Having reserved a resource, the application now communicates with it, for example in this scenario it requests that the resource play a recorded announcement to the customer. It does this, as shown in FIG. 7, by sending an API IP Resource Command to the SLEE 10 with the announcement type included (step 54). The SLEE's External API Resource Handler 19Hext receives this message and sets up a dialogue with the resource by allocating an Id from the Free Dialogue Id's store to the call's Application IP Resource (step 55). It then associates this Dialogue Id with the command and sends it to the mapped resource (step 56).

Having sent such a command, the application will leave the resource to generate the announcement and proceed to handle another call under the control of the Scheduler 15. To do this, the application must suspend the call by first sending an API Suspend command to the SLEE 10, and then sending an API Provide Instruction command.

In this scenario, this first API Resource Command is for generating a "Welcome" announcement and for connecting twelve digits representing the customer's account number and personal identification number (PIN).

Figure 8:
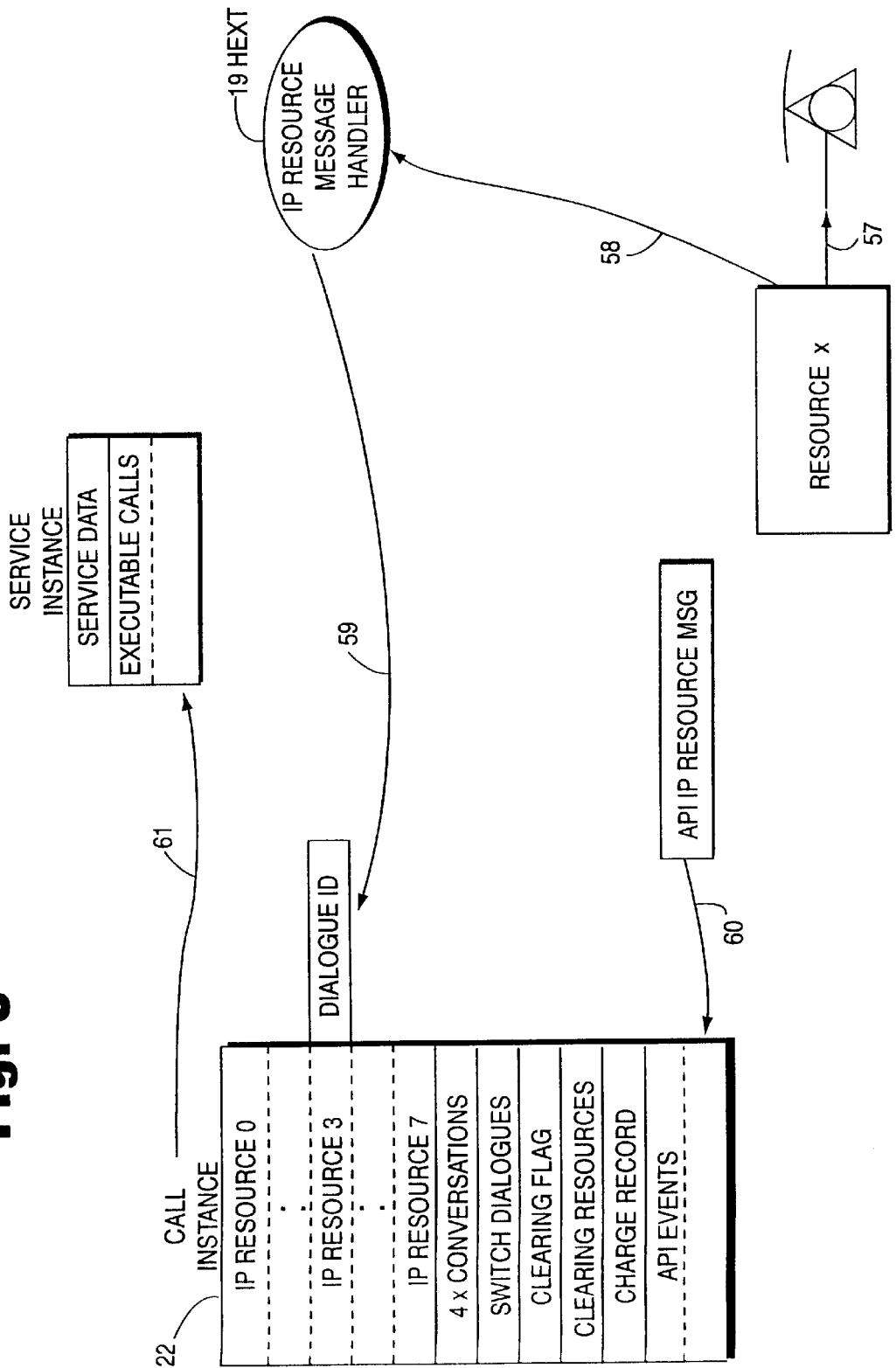
FIG. 8 is a diagram showing the response of the resource.

In FIG. 8, Resource X receives the application's command and starts generating the Welcome announcement, "Welcome to Voicemail. Please enter your account number and PIN." (step 57). Resource X is arranged to identify digits received at any time after the start of the Welcome announcement, and to stop generating the announcement at the time that the first of these digits is received and recognised.

On receipt of the first digit, Resource X sends to the SLEE 10 an API Event message including the value of the first received digit. This message is queued on the API Events section of the Call Instance 22. For the purposes of the present invention it is sufficient to state that this application requires the first digit to perform an initial part of the account number processing, and that not all applications involving account numbers require the first digit for initial processing. The dialogue between the application and the Resource X has not yet finished, i.e. it remains open, so the Dialogue Id is permitted to remain associated with the Call Instance's IP Resource.

In alternative embodiments Resource X contains means to perform validation of the customer's account number and PIN, by accessing a database of customer-related data and comparing a retrieved customer-associated PIN with the customer's dialled PIN. The term "dialled" includes both digits manually entered via a telephone instrument or equivalent, and digits spoken by the customer and recognised by Resource X. In embodiments in which Resource X does not include such validation means, these means may be provided in one of the Conversation Resources 20.

Normally, the customer will enter his eight digit account number and his four digit PIN within a timeout started at the beginning of the announcement, and when twelve digits have been collected the Resource X will send to the SLEE 10 (step 58) a Digits Collected message containing the digits, this message being associated with the same Dialogue Id as was sent to the Resource X by the SLEE 10 with the command.

If the customer had failed to enter twelve digits before the timeout, or if for any other reason Resource X had not collected twelve recognised digits within the timeout, Resource X would have sent a Collection Failure message to the SLEE 10.

The application will deem the dialogue finished upon receipt of either the Digits Collected message or the Collection Failure message and will proceed to remove the Dialogue Id and to place it back in the list of free Dialogue Id's.

The SLEE's External IP Resource Message Handler 19Hext receives the message and retrieves the Call Instance 22 by means of the association with the Dialogue Id (step 59). The message is then added to the Call Instance's API Events queue as an API IP Resource Message (Msg) event (step 60) and the Call Instance 22 itself is added to the list of Executable Calls of the owning Service Instance (step 61). The Scheduler 15 is now triggered once again.

Figure 9:
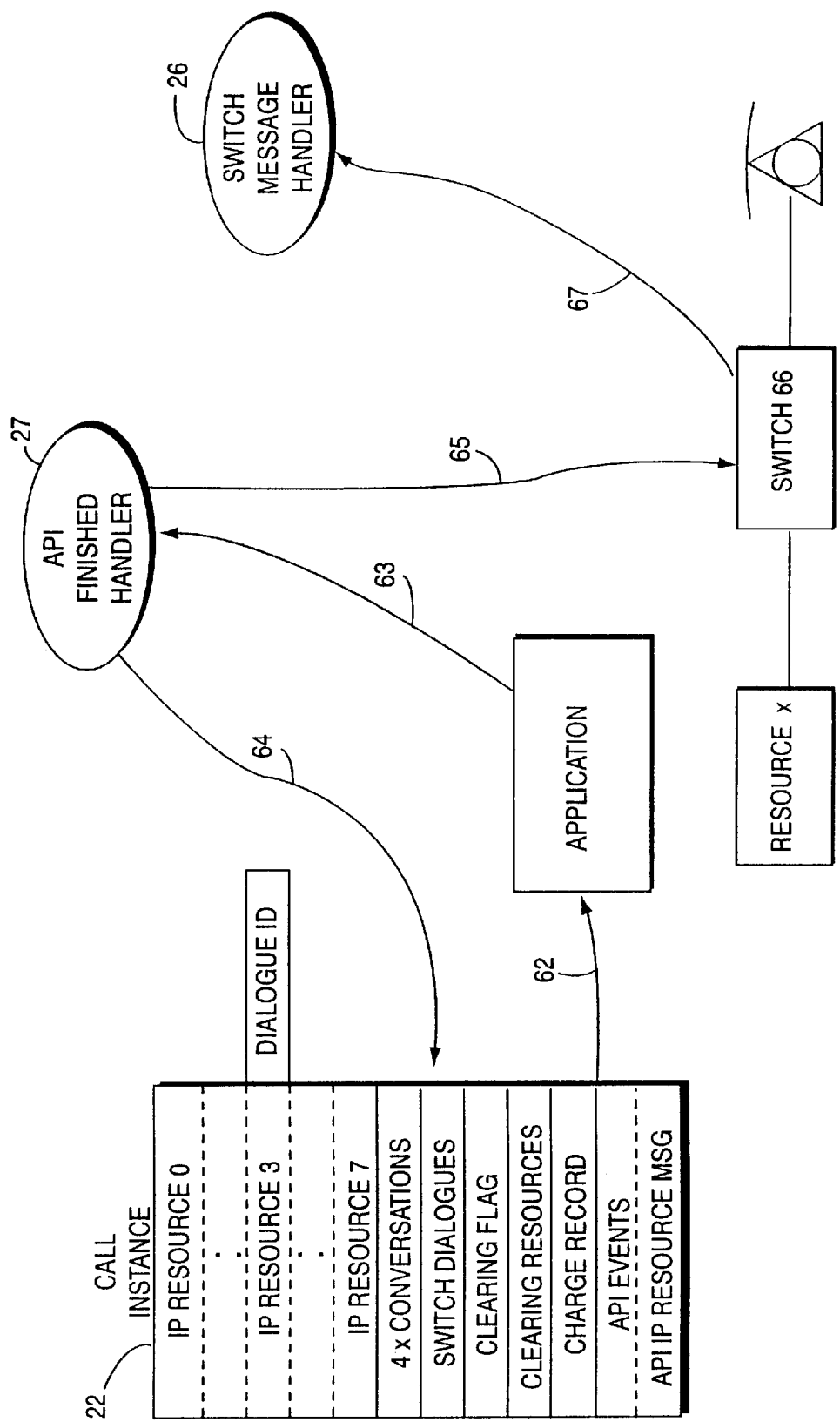
FIG. 9 is a diagram showing the procedure when the application has finished.

When the Scheduler 15 decides that it is the call's turn once more, the API IP Resource Msg event, and the message itself, are sent to the application (step 62), as shown in FIG. 9.

The application now proceeds to the next following state in the state table for the service and accesses a database 29 associated with that application type using the collected account number to retrieve a PIN stored with the account number and to compare the retrieved PIN with the collected PIN.

If the PINs match, the application accesses the database again to retrieve the customer style of address and the time (including date) when the last retrieve access was made, and to overwrite that time with the time of the present retrieval access. The application now sends a second API Resource command including two fields containing respective variable parameters, the first being the customer's address style and the second being the last retrieval time (including date). The application then sends an API Suspend command and an API Provide Instruction command and waits for the Scheduler 15 to send it details from the next selected Call Instance 22.

The SLEE 10 now allocates a new Dialogue ID, by the External IP Resource Handler 19Hext, and passes this second API Resource command to the Resource X in the same way as for the first API Resource command. On receipt, the Resource X generates an announcement having a number of fixed components and a number of variable components, namely, "Hello" (fixed), "Andy," (variable, the customer's style of address), "You last used voicemail at" (fixed), "three thirty pm" (variable), "on the" (fixed), "tenth" (variable), "of" (fixed), "June" (variable). This provides a measure of security, because if the customer had not accessed voicemail on that occasion he will now know that someone else was in possession of his PIN and can take steps to change his PIN. This can be done by the customer contacting an operator who, after making appropriate security investigations, will make a call into the service node and via a management logic type of Conversation Resource 20 modify the database 28, this resource making a "call" request via its handler 20H to create a call instance in which its identity is entered at Conversation Resource 0.

When the Resource X has finished generating this second announcement it will send an API IP Resource Message to the SLEE 10 which will enter it in the Call Instance's API Events queue.

When the application next processes this Call Instance it will go to the next state which is to inform the customer how many voicemail messages have been deposited in his voicemail store. The application accesses the database to retrieve the number of deposited voicemail messages and sends a third API Resource command including a field containing this number and another field containing the time. Again, the application then sends an API Suspend command and an API Provide Instruction command.

The SLEE 10 sends this third command to Resource X, which is still reserved for this call, by allocating a free Dialogue ID in the same manner as before.

Resource X responds to this third command by generating an announcement comprising a plurality of components, two of which are variable components. The first component is "Good", which is fixed. The second component is variable and is selected from "Morning", "Afternoon", or "Evening" depending upon the value in the time field of the received command, i.e. the Resource X has three time windows, midnight to midday, midday to 6.00 pm, and 6.00 pm to midnight, and makes the selection by comparing the time value with the window boundaries to determine the appropriate window and hence the corresponding component. The third component is "Welcome to voicemail. You have", which is fixed. The fourth component is variable and is selected from a range of words (speech segments) corresponding to the possible number of voicemail messages in the voicemail message database, in other words, from "no" to, for example, "twenty". The fifth component is "new", which is fixed. The sixth component is variable and is selected from "message" or "messages" depending upon whether there is a single voicemail message or a plurality of voicemail messages or no voicemail messages.

In practice, the application will have further stages, e.g. asking the customer if he wants to know the names of the people who have deposited voicemail messages (when depositing a voicemail message they would have been asked to state their name), informing the customer of those names (possibly in association with voicemail message numbers), receiving the customer's selection and generating the voicemail message (by retrieval from the voicemail platform database via a protocol conversion type of Conversation Resource 20 over a communications link between the service node and the remote platform), asking the customer if he wants to delete the voicemail message or leave it or archive it, and managing the voicemail message database in the event that the customer hangs up (terminates his call) during generation of a deposited voicemail message. However, the skilled person in the art will understand the operation of the service node and its SLEE sufficiently without a detailed description of such further stages of the voicemail service.

In alternative embodiments the Resource X has sufficient intelligence by virtue of its controlling program to generate an announcement offering the customer a plurality of numbered service-related options, e.g. "For service option A, press one, for service option B, press two, etc." and to generate a further respective announcement offering a different plurality of numbered service-related options on receipt of a recognised number from the customer. In other words the resource plays tree-structured menus to ascertain what the customer wants, and either provides the requested service if it has that capability or sends a command with appropriate customer-associated data to the SLEE for action by the appropriate Application Type.

When the application reaches a final state, e.g. has received from the customer a positive indication that he is terminating his access to the service or has received from the Resource X that a timeout has occurred, then it sends an API Finished signal to the SLEE 10 (step 63). This is received by an API Finished Handler 27 of the SLEE 10 which commences to clear down the call.

First, the SLEE 10 must disconnect the speech paths. It allocates a free Switch Dialogue to the Call Instance 22 (step 64) and sends a message to the switch 17 requesting the disconnection of Resource X and the caller (step 65). The switch 17 performs the disconnection (step 66) and returns a Disconnection Complete message back to the SLEE 10 (step 67).

Figure 10:
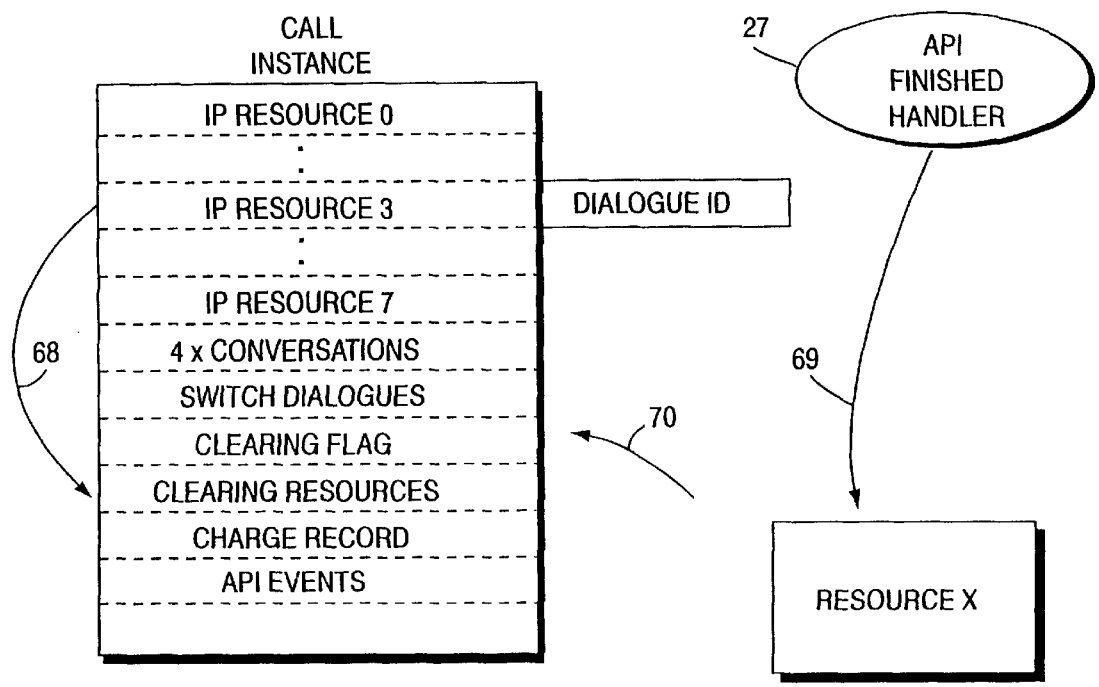
FIG. 10 is a diagram showing the procedure when the call clears.

If Resource X is still in open dialogue with the SLEE 10 then it must be cleared down. The SLEE 10 does this as shown in FIG. 10, by first sending the mapped IP Resource 3 into clearing by moving the mapped resource into the Call Instance's Clearing Resources location (step 68), and then sending a Clear Down message to Resource X (step 69). The incoming call is cleared in a similar way through the Call Model 14 and the call is marked as currently being cleared down (step 70).

Resource X receives the message and initiates its clear down procedure as shown in FIG. 11. When it has finished clearing down, it sends a Clear Down Complete message to the SLEE 10 (step 71). This message is received by the SLEE's External IP Resource Message Handler 19Hext which retrieves the Call Instance by means of the association with the Dialogue Id. This Dialogue Id is removed from the resource and placed back in the Free Dialogue Ids store (step 72). The resource itself is moved out of the Call Instance 22 and back into the Free Resources store (step 73).

If this was the last resource to clear belonging to the call (i.e. the incoming call has also finished clearing) then the call is complete. The Charge Record is time stamped and then sent out to the Billing System 18 (step 74).

What is claimed is:

1. A service node for use in an intelligent communications network for providing services for customers, said service node comprising:

service defining means arranged to define a plurality of services;

resource means comprising a plurality of speech applications platforms (SAPs) and a plurality of digit collecting means;

a switch connected by a speech path means to said resource means; and node controlling means connected to the switch by a signalling link and arranged to respond to an incoming call from a customer routed by the network to the service node by passing details of the call to the service defining means for processing, queuing the call if required due to already ongoing call processing, logically connecting the service defining means to the resource means and to the switch for the passage of command signals and response signals, and commanding the switch to connect the resource means to the incoming call:

the node being characterised in that:

each SAP comprises a store for storing speech segments, each segment having a corresponding identity, and a controlling means arranged to respond to receipt of a predetermined command signal containing the identity of a predetermined speech announcement by:

(i) converting the identity of the predetermined speech announcement to a corresponding succession of speech segment identities, (ii) accessing its speech segment store in accordance with the speech segment identities, (iii) controlling the SAP to generate the corresponding speech segments for the speech announcement, (iv) commanding the connection of a digit collecting means to the incoming call and activating it to collect from the customer a predetermined number of digits, and (v) commanding a corresponding response signal, including the predetermined number of collected digits, to be sent to the node controlling means.

2. A service node as in claim 1, wherein:

the plurality of digit collecting means is separate from the plurality of SAPs, the speech path means comprises respective first speech paths from the switch to the SAPs and respective second speech paths from the switch to the plurality of digit collecting means, and each SAP controlling means is arranged to respond further to receipt of the predetermined command signal by reserving one of said plurality of digit collecting means and commanding the switch to connect the respective second speech path of the reserved digit collecting means to the incoming call.

3. A service node as in claim 1, wherein:

each SAP is associated with a respective one of said digit collecting means, the speech path means comprises respective first speech paths from the switch to the SAPs and a respective second speech path from each SAP to its associated digit collecting means, and each SAP controlling means is arranged to respond further to receipt of the predetermined command signal by controlling its SAP to connect its respective first speech path to its respective second speech path.

4. A service node as in claim 1 wherein:

each SAP controlling means is arranged to command the activated digit collecting means connected to the incoming call to send the response signal to the node controlling means.

5. A service node as in claim 1 wherein:

each SAP controlling means is arranged to command the activated digit collecting means connected to the incoming call to provide the collected digits for inclusion in the response signal.

6. A service node as in claim 1 wherein:

the resource means further comprises a database of customer-related digits, and means for validating the predetermined number of collected digits by comparison with corresponding digits stored in the database for the customer, and each SAP controlling means is arranged to respond further to receipt of the predetermined command signal by providing the collected digits to the validating means and commanding the validating means to validate the collected digits and return a signal indicative of the result of the validation.

7. A service node as in claim 1 wherein each SAP controlling means is arranged to respond to receipt of a further command signal containing the identity of a further speech announcement offering the customer a plurality of numbered service-related options, by:

converting the identity of the first speech announcement to a corresponding succession of speech segment identities;

accessing its speech segment store in accordance with the speech segment identities;

controlling its SAP to generate the corresponding speech segments for the further speech announcement;

activating a digit collecting means connected to the incoming call to collect a digit representing the customer's selection from the numbered service-related options; and in response to collection of said digit, generating a still further speech announcement corresponding to the collected digit and offering a different plurality of numbered service-related options.

8. A method of operating a service node in an intelligent communications network for providing services for customers, said method comprising the steps of:

receiving from a customer an incoming call routed by the network to the service node and passing details of the incoming call to a service defining means for processing, queuing the call if required due to already ongoing call processing;

connecting a digit collecting means, and a speech applications platform (SAP), to the incoming call in response to a request from the service defining means;

sending a command signal containing the identity of a predetermined speech announcement from the service defining means to the SAP;

the method being characterised by the steps of responding to receipt of the command signal by the SAP, by:

converting the identity of the predetermined speech announcement to a corresponding succession of speech segment identities;

accessing, in accordance with said speech segment identities, a speech segment store and retrieving speech segments corresponding to the speech segment identifies;

generating the retrieved speech segments;

collecting with the digit collecting means a predetermined number of digits dialed by the customer; and sending to the service defining means a response signal including the predetermined number of digits.

9. A method as in claim 8, wherein the connecting step comprises:

controlling a switch, at which the incoming call is received, to connect the incoming call to first and second speech paths coupling the switch to the SAP and the digit collecting means, respectively.

10. A method as in claim 8, wherein the connecting step comprises:

controlling the SAP to connect a first speech path, which extends from the SAP to a switch, at which the incoming call is received, to a second speech path, which extends from the SAP to the digit collecting means.

11. A method as in claim 8, in which the SAP further responds to receipt of the command signal by:

providing the collected digits to a validating means, and commanding the validating means to validate the collected digits and return a signal indicative of the result of the validation.

12. A method as in claim 8 including the further steps of:

sending to the SAP a further command signal containing the identity of a further speech announcement, offering the customer a plurality of numbered service-related options, and on receipt of said further command signal at the SAP, generating the further speech announcement, collecting a digit representing the customer's selection from the numbered service-related options and, in response to collection of said digit, generating a still further speech announcement corresponding to the collected digit, and offering a different plurality of numbered service-related options.

* * * * *